United States Patent
Reynolds et al.

[19]

[11] Patent Number: 6,149,063
[45] Date of Patent: *Nov. 21, 2000

[54] METHOD AND APPARATUS FOR BAR CODE ASSOCIATION FOR WIRELESS NETWORK

[75] Inventors: Andrew Edward Reynolds, Bothell, Wash.; Stephen W. Burnett, Bedford, N.H.

[73] Assignee: Intermec IP Corp., Woodland Hills, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/152,996

[22] Filed: Sep. 14, 1998

[51] Int. Cl.$^7$ ........................................................ G06K 7/10
[52] U.S. Cl. ................................ 235/472.02; 235/472.01
[58] Field of Search ........................ 455/466; 235/472.01

[56] References Cited

U.S. PATENT DOCUMENTS

| | | |
|---|---|---|
| 4,418,277 | 11/1983 | Tremmel et al. . |
| 4,910,794 | 3/1990 | Mahany . |
| 5,029,183 | 7/1991 | Tymes . |
| 5,031,098 | 7/1991 | Miller et al. . |
| 5,195,183 | 3/1993 | Miller et al. . |
| 5,295,154 | 3/1994 | Meier et al. . |
| 5,330,370 | 7/1994 | Reddersen et al. . |
| 5,349,678 | 9/1994 | Morris et al. . |
| 5,425,051 | 6/1995 | Mahany . |
| 5,541,398 | 7/1996 | Hanson . |
| 5,664,229 | 9/1997 | Bhargava et al. . |
| 5,876,139 | 3/1999 | De Laforcade . |
| 5,905,249 | 5/1999 | Reddersen et al. . |
| 6,006,100 | 12/1999 | Kornok ..................................... 455/466 |

*Primary Examiner*—Harold I. Pitts
*Attorney, Agent, or Firm*—O'Melveny & Myers LLP

[57] ABSTRACT

A wireless network having a base station adapted for wireless communications, a wireless bar code scanner and a network ID label having a bar code symbol printed thereon. The bar code symbol includes encoded information pertaining to the base station. A wireless bar code scanner is adapted to scan and decode the network ID label. The wireless bar code scanner initiates a communications link with the base station utilizing information from the decoded network ID label. The wireless bar code scanner includes a light source for illuminating a printed bar code symbol, an electro-optical element for imaging the printed bar code symbol, a decoder for decoding the imaged printed bar code symbol into an alphanumeric string, and an input/output device for conducting wireless communications with the base station.

20 Claims, 8 Drawing Sheets

METHOD AND APPARATUS FOR BAR CODE ASSOCIATION FOR WIRELESS NETWORK

BACKGROUND OF THE INVENTION

1. Field of the Invention

The present invention relates to wireless data-collection terminals, and more particularly, to the association of a wireless bar code scanner to a base station without physical contact between the wireless scanner and the base station.

2. Description of Related Art

In the automated identification and data capture industry, it is known to operate a wireless local area network (LAN) that includes a plurality of handheld data-collection terminals that communicate over a radio frequency (RF) channel with a central host computer. The data-collection terminals enable an operator to scan and decode data that may be encoded in the form of a one or two-dimensional bar code symbology. The decoded information is then transmitted back to the host across the RF channel. Such wireless LAN systems are particularly well suited to data capture applications as diverse as process and inventory control, time and attendance monitoring, security management, customer service and point of sale recording, shipping and receiving record keeping, and warehouse operations.

The wireless LAN may further include one or more printers for producing bar code labels used in identifying items that are tracked in a particular data capture application. To achieve maximum data throughput, dedicated thermal printers are generally coupled directly to the central host computer through a hard-wired communication link. The printers may further be located in a climate controlled environment that is otherwise isolated from the rest of the LAN.

From time to time, it becomes necessary for a wireless data-collection terminal to communicate directly to a printer or to a computer terminal in one or more wireless networks. For example, a test batch configuration may be stored in memory within a data-collection terminal and loaded directly into one or more printers to insure uniform print results (referred to as "cloning"). Alternatively, an operator of a data-collection computer in a large facility may wish to utilize a local printing station disposed in near proximity to a work location rather than returning to a central printing station adjacent to the central host computer. In these situations, the operator must establish a communications link between the data-collection terminal and the printer or computer terminal in the wireless network. This can be accomplished using conventional cables having standard interface connectors, e.g., an RS-232 connector on a printer cable, which allows for communications between the two devices across the cable.

Despite the advantages of coupling the data-collection terminal directly to the printer, there are numerous operational difficulties that make such a connection impractical. For example, the physical connection across the cable greatly reduces the operational range of the data-collection terminal. In addition, repeated connection and disconnection of interface cables tends to weaken the connectors of the two devices resulting in intermittent electrical connections.

Even more significant is the threat of harm to either of the printer or the data-collection terminal due to effects such as electro-static discharge (ESD) or electromagnetic interference (EMI). ESD refers to sparks or electrons that jump from an electrically charged object to an approaching conductive object. EMI refers to electromagnetic waves that emanate from an electrical device, including both low-frequency waves from electromechanical devices and high-frequency waves (RFI) from electronic circuit chips and other electronic devices. Any ESD which results from the coupling of the interface cable between the printer and the data-collection computer can damage the delicate electronic circuitry of either of the two systems. Moreover, EMI from an unshielded or poorly shielded interface cable can interfere with the operation of the printer or the data-collection computer, resulting in further damage or degradation of system performance.

To retain portability and resolve other of the above problems, it is known in the art to establish a wireless communications link between the data-collection terminal and the printer or computer terminal of the wireless network. A prior art system for "associating" a wireless scanner with a computer terminal is illustrated in FIG. 1. The system includes a host computer 10, a wedge 18 and a data-collection terminal 20, which is a conventional wireless scanner. A keyboard 14 is provided for user input and is connected to the host computer 10 through a cable 16.

The wedge 18 is connected to the cable 16, between the keyboard 14 and the computer 10. The wedge 18 includes a receiving cavity 22 and an antenna 26 which is used for wireless communication over an RF channel with the wireless scanner 20. The wireless scanner 20 includes an antenna 28 and has a bottom portion 26 adapted to engage the receiving cavity 22 of the wedge 18.

In operation, the wireless scanner 20 cannot communicate with the host computer 10 until a communications link is established between the wireless scanner 20 and the wedge 18. This requires both the wireless scanner 20 and the wedge 18 to utilize the same protocol, RF channels, etc. To establish such a link, the user inserts the bottom portion 26 of the scanner into the receiving cavity 22 of the wedge 18. The bottom portion 26 and the receiving cavity 22 include mating electrical connections (not shown), through which initial communications between the two devices are conducted.

The wedge 18 senses that the wireless scanner 20 has been inserted into the cavity 22 and seeks authorization from the computer 10 to establish a wireless communications link. If the computer 10 allows the wireless scanner 20 to join in the wireless network the wedge 18 sends information to the scanner 20 regarding frequency, protocol, unique IDs and any other information needed to establish communications. The wireless scanner 20 stores this information and can then be removed from the wedge 18 and used anywhere within range of the antenna 26. When a printed bar code symbol is scanned and decoded by the wireless scanner 20, the decoded information is transmitted from the wireless scanner 20 through the antenna 28, and the decoded information is received at the wedge 18 through antennae 24 where it is used as input for the host computer 10.

The prior art system of FIG. 1 has many drawbacks. For example, repeated physical connection between the wireless scanner 20 and the wedge 18 can result in wear of the connecting parts. Further, because a physical connection is required to associate the wireless scanner 20 to the wedge 18, ESD and EMI are still a problem. Another drawback is that a user must locate the wedge 18 which may be inconveniently located in a work area. Multiple wedges could be placed throughout the work area making them more accessible, but this requires additional hardware and wiring, making the wireless network more expensive and more complex.

SUMMARY OF THE INVENTION

The present invention provides a convenient and economical method and apparatus for associating a wireless device to a wireless network without requiring a physical interface between the wireless device and the wireless network.

In one embodiment of the present invention, a wireless network includes a base station, a wireless bar code scanner and a network ID label. The base station is adapted for wireless communications with one or more wireless bar code scanners. The base station may include a host computer having a keyboard connected to the host computer through a cable, and a wedge connected to the cable between the keyboard and host computer. The wedge includes a radio device for communicating with wireless devices in the wireless network.

The wireless scanner is adapted to scan and decode printed bar code labels and transmit the decoded information to the base station over a wireless communications link. The wireless scanner includes a decoder, an I/O device and an interface controller. The decoder includes algorithms for decoding standard bar code symbologies into alphanumeric strings. These decoded alphanumeric strings are sent to the I/O device which transmits the alphanumeric strings to the base station.

The network ID label includes a printed bar code symbol having coded information for initiating a communications link between the wireless bar code scanner and the base station. In a preferred embodiment, the network ID label is a modified bar code symbol, for example, a Code 39 symbology without the "start" and "stop" symbols. The decoder of the wireless scanner includes algorithms for decoding these modified bar code symbols used in the network ID labels. These decoded symbols are sent to the interface controller which utilizes the information to initiate a communications link between the wireless scanner and the base station.

In a second preferred embodiment, the network ID label is coded using standard bar code symbologies. A switch moveable between a first and second position is provided on the wireless scanner. The switch directs the decoded information as it leaves the decoder. In the first position, the decoded alphanumeric string is sent directly to the I/O device which transmits the string to the base station. In the second position, the decoded alphanumeric string is sent to the interface control, which utilizes the decoded information to initiate a communications link between the wireless scanner and the base station. In a third preferred embodiment, the wireless scanner is adapted to transmit a digitized image of a scanned bar code symbol to a wireless base station where the digitized image is decoded.

The present invention also includes a method for wireless association between a wireless bar code scanner and a base station. First, a network ID label is provided with communications information for initiating a wireless communications link between a scanner and the base station. Next, the network ID label is scanned by the wireless bar code scanner and decoded, thereby obtaining communications information for initiating a wireless communications link with the base station. The scanner then initiates the communications link between the scanner and the base station utilizing the decoded information.

A more complete understanding of the method and apparatus for bar code association for a wireless network will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF A PREFERRED EMBODIMENT

The present invention satisfies the need for a convenient and economical method and apparatus for associating a wireless scanner with a base station without requiring physical interface between the wireless scanner and the base station. In the detailed description that follows, like element numerals are used to describe like elements illustrated in one or more of the figures.

Figure 1:
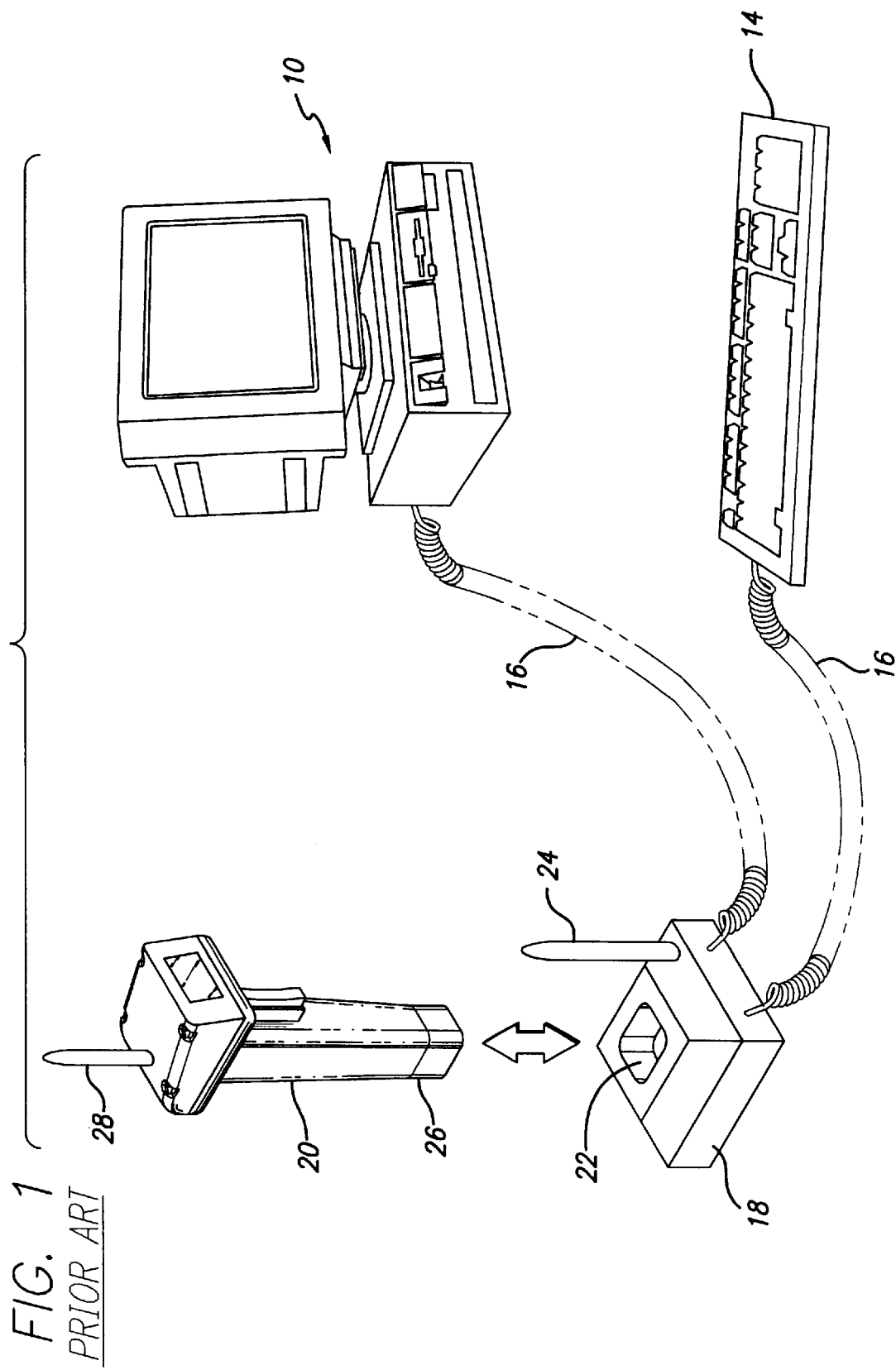
FIG. 1 is a diagram illustrating a prior art association between a scanner and a base station.
Figure 2:
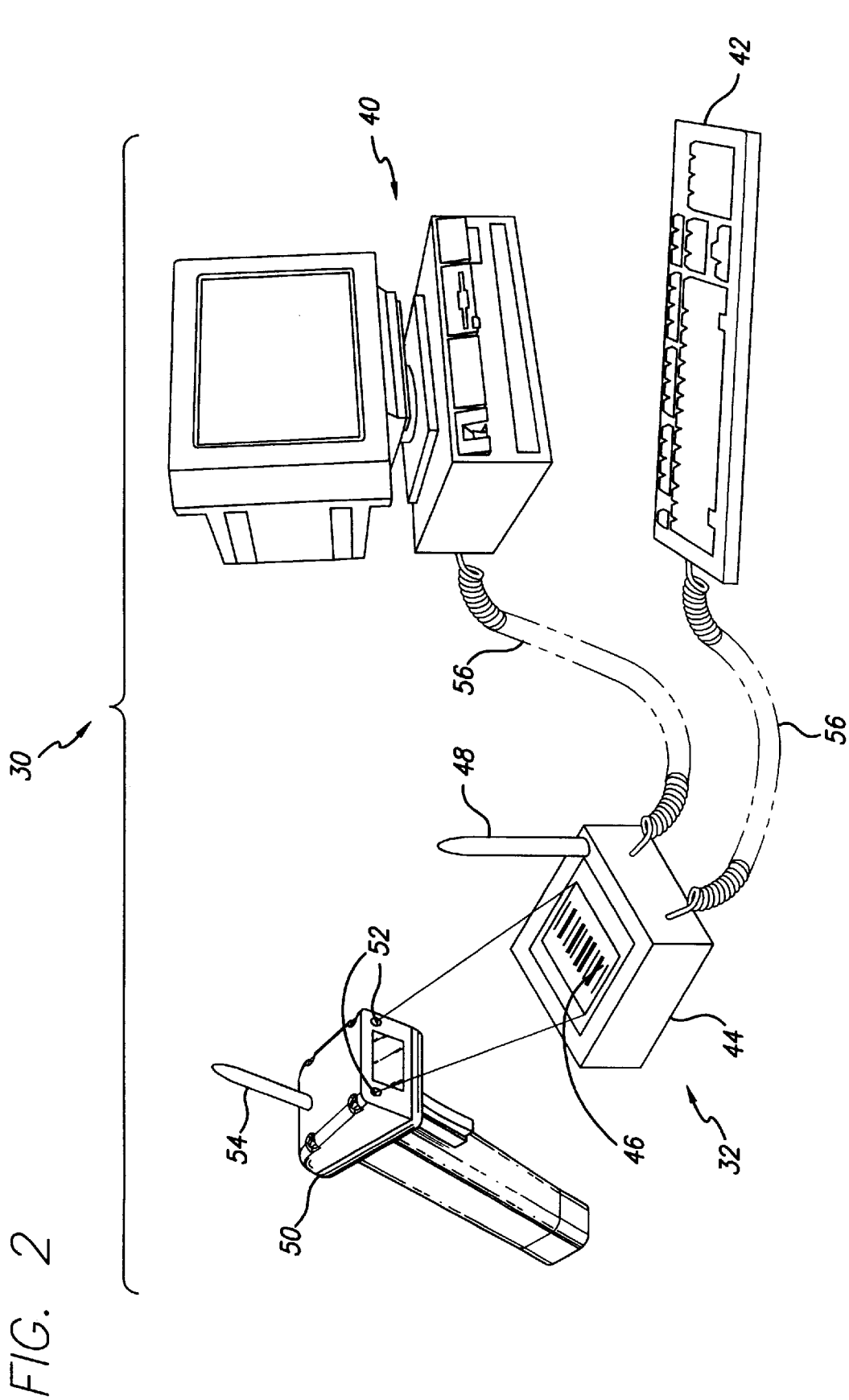
FIG. 2 is a diagram illustrating an embodiment of the bar code association of the present invention.
Figure 3:
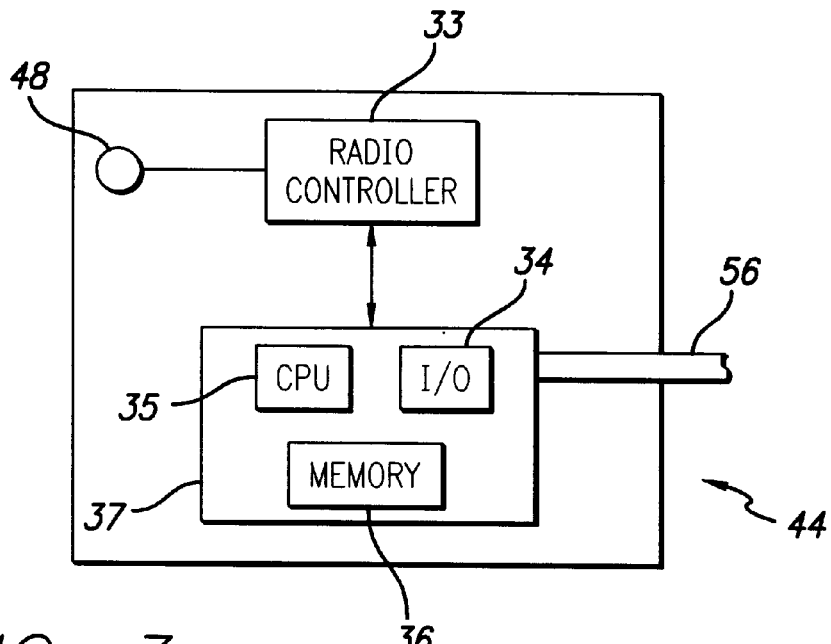
FIG. 3 is a block diagram of the wedge of an embodiment of the present invention.
Figure 4:
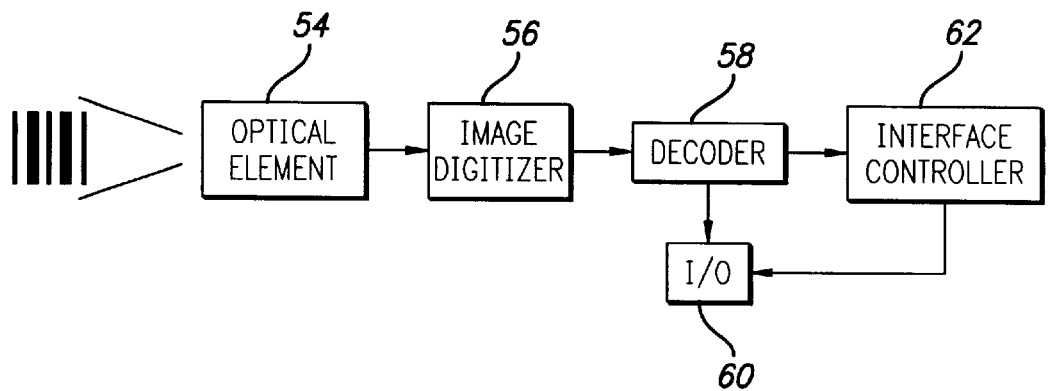
FIG. 4 is a block diagram of the wireless scanner of a first embodiment of the present invention.

A first preferred embodiment of the present invention will now be described with reference to FIGS. 2–4. A wireless scanning system 30 includes a base station 32 and a wireless scanner 50. The base station 32 includes a host computer 40, a keyboard 42, a wedge 44. The host computer 40 is a general purpose computer for running software applications that utilize scanned user input. The keyboard 42 is connected to the computer 40 through a cable 56. The wedge 44 is connected to the cable 56, between the keyboard 42 and the computer 40. As known in the art, the wedge 44 is capable of providing alphanumeric input to the computer 40, as an alternative to keyboard 42.

The wedge 44 includes a network ID label 46 disposed on a surface thereof, and an antenna 48 for transmitting and receiving radio signals for communicating with wireless scanners, such as the wireless scanner 50. The wireless scanner 50 can scan printed bar code symbols, decode the symbols into alphanumeric strings, and transmit those strings through an antenna 54, disposed on the wireless scanner, to a base station in a wireless network, such as wedge 44. As known in the art, the antenna 54 may be disposed on either the exterior of the wireless scanner 50 (as illustrated in FIG. 2) or in the interior of the wireless scanner 50 (not shown).

Before the wireless scanner 50 can communicate with the host computer 40, the wireless scanner 50 must first "associate" with the wedge 44, i.e., establish a wireless communications link. According to the present invention, a user associates the two devices by utilizing the wireless scanner 50 to scan and decode the network ID label 46. The network ID label 46 may be placed anywhere in the range of the base and in the first preferred embodiment is located on a face of the wedge 44. The network ID label 46 includes information necessary to initiate communications between the wireless scanner 50 and the wedge 44, e.g., control frequency, unique ID for the wedge 44, etc. As will be discussed below, the wireless scanner 50 is able to distinguish between the network ID label 46 and other printed bar code labels.

It should now be apparent that the present invention provides many advantages over the prior art. The present invention accomplishes the association without requiring additional connectors and secondary communications devices that are common in the prior art. Wear on parts is avoided because there is no physical contact required in the association. Further, as will be apparent from the discussion below, network ID labels are inexpensive and multiple network ID labels can be utilized and placed anywhere within radio range of the wedge 44, providing easy access for a user. Thus, the present invention makes association between the scanner and wedge convenient to the user, without adding additional hardware components and complexity to the wireless network. Further, because no physical contact is required, the base can be removed from the work areas and placed in locations where the RF signals get the best coverage, for instance, in the rafters of the warehouse.

The wedge 44 will now be described with reference to FIG. 3. The wedge 44 includes a radio controller 33 connected to a circuit board 37 which includes an input/output (I/O) device 34, a CPU 35 and a memory 36. The CPU 35 controls the overall operation of the wedge 44. The memory 36 includes a ROM, which includes program instructions for controlling the CPU, and a conventional RAM. The I/O device 34 is connected to the cable 56 and controls the communications between the wedge 44 and the host computer 40. The radio controller 33 is connected to the antenna 48 and is used for wireless communications.

The wireless scanner 50 will now be described with reference to the block diagram of FIG. 4. The wireless scanner 50 includes an optical element 54, an image digitizer 56, a decoder 58, an I/O device 60 and an interface controller 62. The optical element 54 includes a light sensor such as a charge coupled device (CCD) or other high speed, high density data storage medium capable of directly converting optical data into pixel data. A light source 52 (shown in FIG. 2) is provided to illuminate a printed bar code symbol, such as the network ID label 46. In the first preferred embodiment, the light is reflected from the printed bar code symbol and is received by the optical element 54 and converted to a pixel image by the image digitizer 56. It will be appreciated by those having ordinary skill in the art that other wireless scanners, such as a laser scanner, being implemented in other configurations could also be used consistent with the teachings of the present invention.

The decoder 58 includes algorithms for recognizing standard bar code symbologies from the pixel image and converting the pixel image into a string of alphanumeric characters. If the decoder 58 is able to decode the pixel image, the resulting alphanumeric string is sent to the I/O device 60. The I/O device 60 communicates between the wireless scanner 50 and a base station through a radio and antenna 54 to conduct RF communications in the wireless network. If a wireless communications link is established between the wireless scanner 50 and the wedge 44, the I/O device 60 sends the decoded alphanumeric string to the wedge 44 where it can be utilized as data input by a host computer 40.

When the scanner 50 reads the network ID label 46, the scanner 50 must recognize that the information is not merely data to be passed along to a base station, but information needed to establish a new wireless communications link. Thus, in the first preferred embodiment, the decoder 58 is capable of reading a set of modified bar code symbols which are utilized for network ID labels. If the decoder 58 is unable to decode the pixel image in accordance with standard bar code symbologies, the decoder 58 will attempt to decode the pixel image utilizing the set of modified bar code symbologies. These modified bar code symbols also provide network security because only devices that are intended to be associated with the network will be able to decode the network ID label.

Figure 5A:
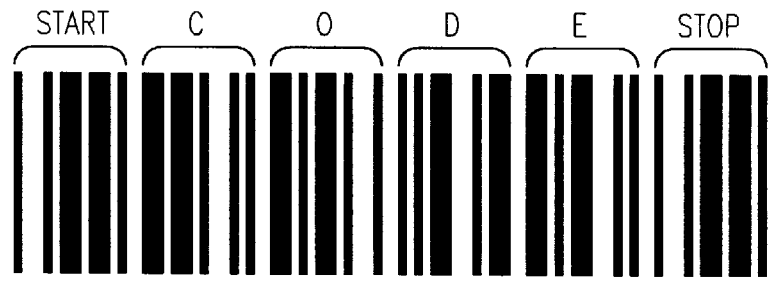
FIG. 5A illustrates a Code 39 bar code symbology.
Figure 5B:
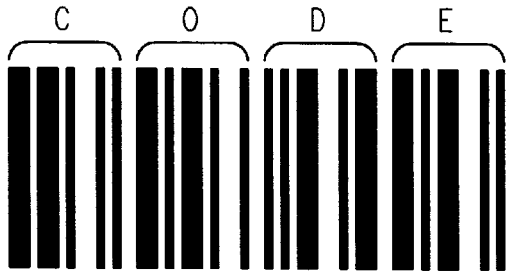
FIG. 5B illustrates a modified Code 39 bar symbology used in a network ID label of the first preferred embodiment of the present invention.

Although an infinite number of symbologies can be created for bar codes, it is preferred that these modified symbologies incorporate minor modifications to standard symbologies. For example, as shown in FIG. 5A the standard Code 39 symbology includes a "start" symbol, a "stop" symbol and at least one alphanumeric symbol in between. This symbology can be modified as shown in FIG. 5B by removing the "start" and "stop" symbols. The modified symbology of FIG. 5B would be undecodable utilizing standard decoding algorithms. Thus, the decoder 58 includes additional algorithms for recognizing and decoding certain modified bar code symbologies, e.g., the modified Code 39 symbology shown in FIG. 5B.

After the modified symbol is decoded into an alphanumeric string, the decoded string is sent to interface controller 62, where it is parsed into different communications components, such as frequency and a unique ID for the base station. The interface controller 62 controls the communications between the wireless scanner 50 and a base station of a wireless network. As will be discussed further below, the interface controller 62 stores the decoded bar code symbol and utilizes it to set the frequency and protocol for communications.

Figure 5C:
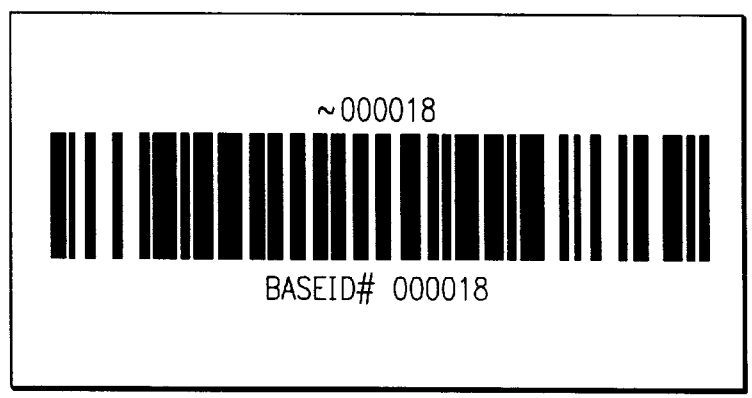
FIG. 5C illustrates a Code 128 bar code symbology according to an alternate embodiment of the present invention.

In an alternate embodiment, the network ID label 46 is encoded using a standard bar code symbology, such as Code 128, and includes one or more special characters encoded in the bar code symbol, such as an uncommon series of ASCII characters. The decoder 58 will recognize that the network ID label 46 should be used for association with a wireless network after it decodes the special characters. For example, FIG. 5C illustrates a network ID label in which the bar code symbol begins with the character "~" before the unique network ID number "000018." The illustrated bar code symbol can be utilized as a network ID label in environments that otherwise would not include printed bar code labels that begin with the character "~." It should be apparent to those of ordinary skill in the art that other characters can be used and can be placed in other locations within the printed bar code symbol.

Figure 6:
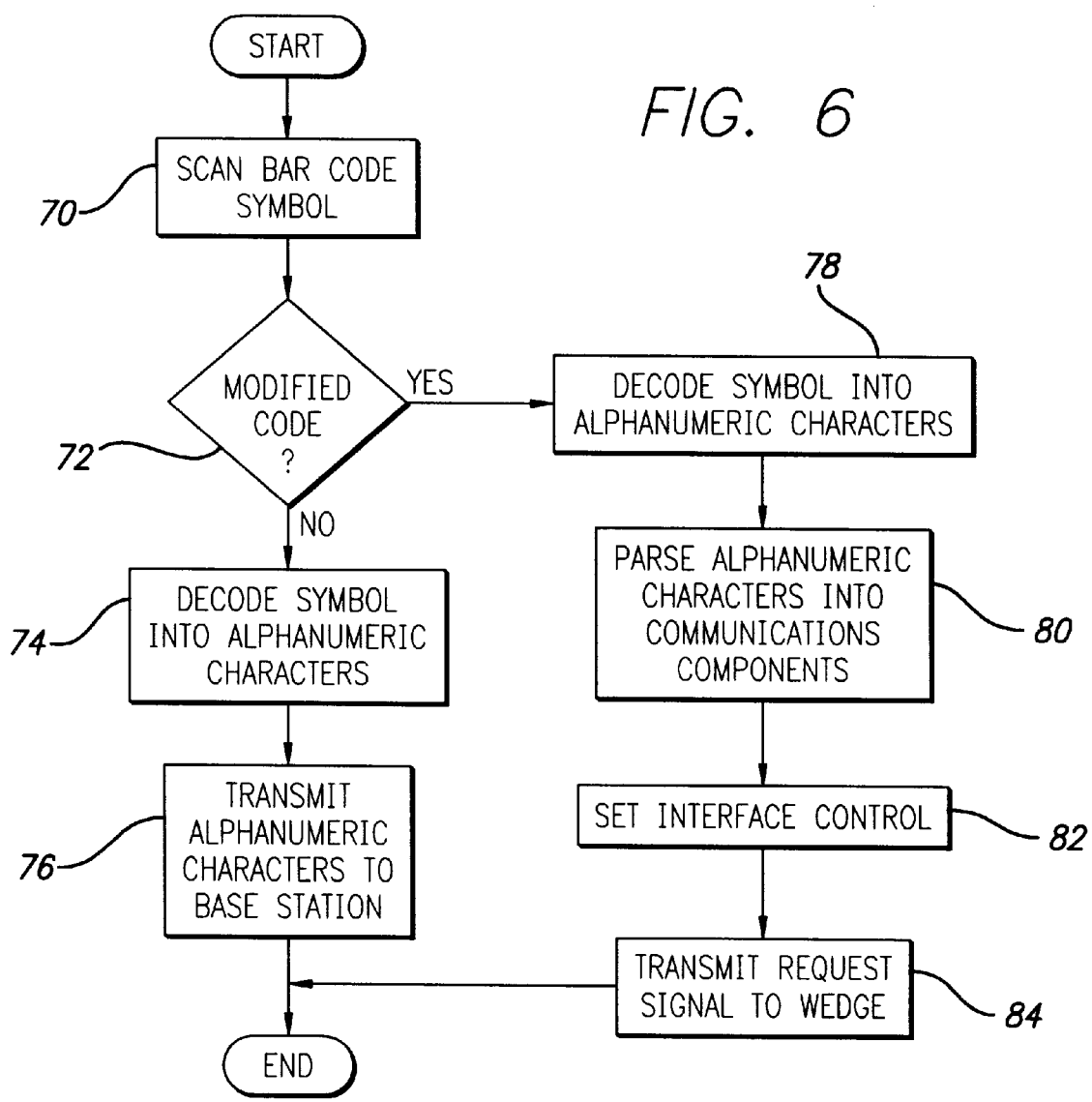
FIG. 6 is a flow diagram illustrating the logic flow of the wireless scanner of the first preferred embodiment of the present invention.

Association of the wireless scanner 50 to the wedge 44 will now be described with reference to FIGS. 6–8. FIG. 6 illustrates the general logic flow of the scanning operations of wireless scanner 50. At Step 70, a bar code symbol is scanned by the user and converted into a pixel image. The decoder 58 determines at Step 72 whether the pixel image represents a standard bar code symbol or a modified bar code symbol. If the pixel image is a standard bar code symbol, the decoder 58 decodes the pixel image into alphanumeric characters at Step 74, and transmits the alphanumeric characters to a base station through the I/O 60 at Step 76.

If the pixel image is a modified bar code symbol, the decoder 58 utilizes the additional algorithms at Step 78 to decode the symbol into a string of alphanumeric characters. This decoded string is next sent to the interface controller 62 at Step 80, where the alphanumeric characters are parsed into respective communications components, such as unique ID for the wedge and a control frequency. The interface controller 62 is then initialized for the new wireless network at Step 82 and instructs the I/O device 60 to transmit a request signal to the wedge 44 at Step 84.

Figure 7:
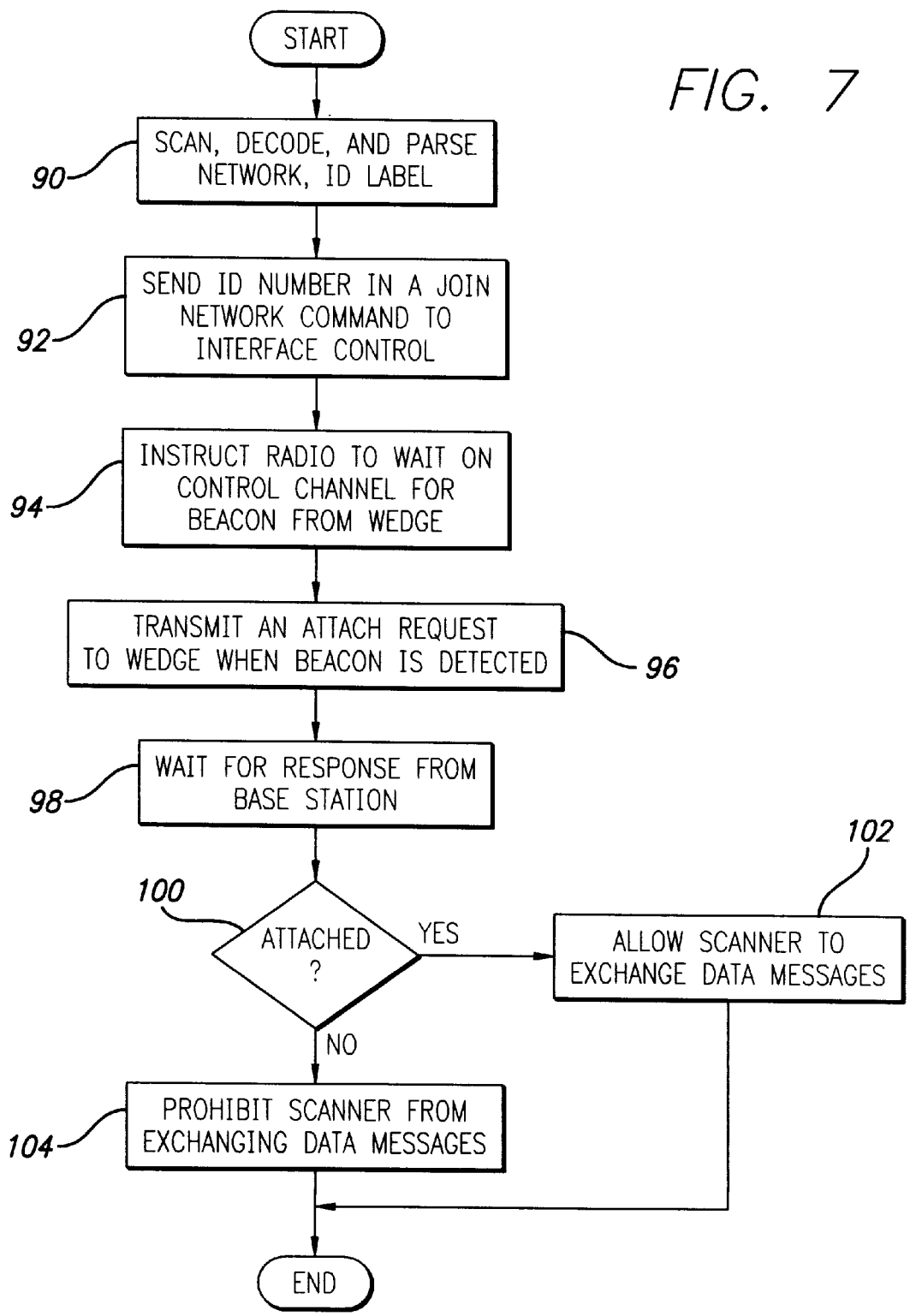
FIG. 7 is a flow diagram illustrating the logic flow for the scanner in establishing a communications link with a base station in the first embodiment of the present invention.

FIG. 7 illustrates the logic implemented by the interface controller 62 and the I/O device 60 in establishing a wireless communications link with the wedge 44. In the first preferred embodiment, the wireless communications may be conducted via radio utilizing a frequency hopping spread spectrum technique (FHSS). As known in the art, FHSS is a form of spread spectrum radio transmission that produces a narrow band signal that hops among a plurality of frequencies in a pre-arranged pattern. FHSS is commonly used in commercial applications due to its ability to minimize errors due to an interference on an individual frequency or jamming. It should be apparent to those of ordinary skill in the art that the present invention can also operate with other wireless communications techniques.

When powered "on," the wedge 44 begins a hopping sequence among a pre-arranged pattern of frequencies. This hopping sequence includes certain frequencies which are designated as "control frequencies." The wedge listens on these control frequencies for lost devices or new requests to associate.

At Step 90, a network ID label is scanned by the scanner 50, decoded by the decoder 58 and sent to the interface controller 62 at Step 92. The interface controller 62 instructs the I/O device 60 at Step 94 to wait on a specified control channel for a beacon from the wedge 44, as determined from the parsed alphanumeric string. During the hopping sequence, the wedge sends out a beacon on the control channel, including its unique network ID number. When the beacon is detected, the I/O device transmits an attach request to the wedge at Step 96. Next, the interface controller 62 and the I/O device 60 listen on the control channel for a response from the wedge 44 at Step 98.

If the wedge 44 responds to the attach request and authorizes the wireless scanner 50 to join the wireless network, then flow is transferred to Step 102 which synchronizes the frequency hopping sequence of the scanner with the frequency hopping sequence of the wedge. In a preferred embodiment, the wedge 44 is a smart device because it is more likely to be stationary, always have power and may have other devices already associated with it. To synch with the wedge 44, the wireless scanner 50 listens to the hopping sequence of the wedge 44 and then joins in at the same sequence. The wireless scanner 50 is now connected to the wireless network and is capable of exchanging data messages with the wedge 44.

In the first preferred embodiment, if the scanner is unable to attach to the network, i.e., the wedge 44 does not respond or does not authorize the wireless scanner 50 to join the wireless network, then the scanner is prohibited from exchanging data messages at Step 104.

Figure 8:
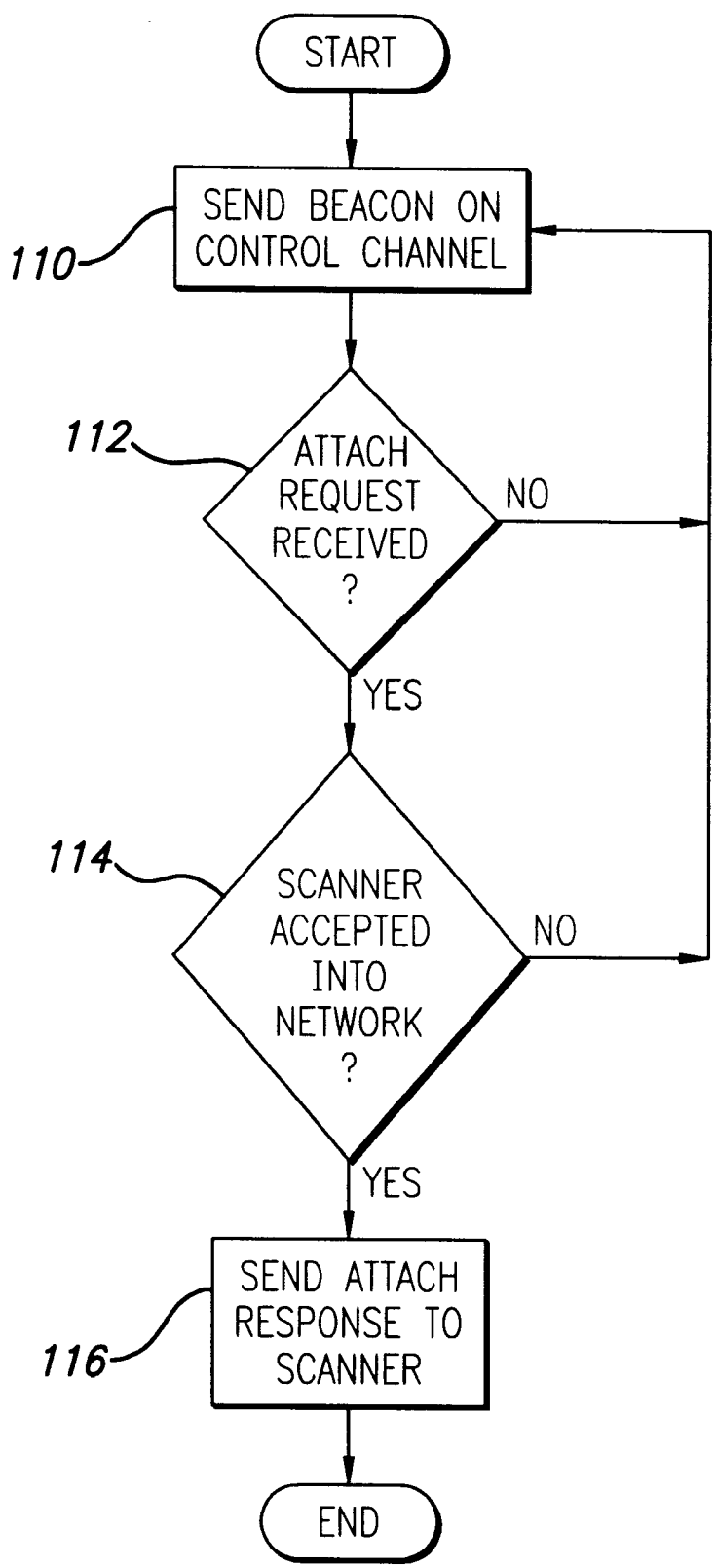
FIG. 8 is a flow diagram illustrating an embodiment of the logic flow for the base station in establishing a communications link with a wireless scanner.

The logic flow of the wedge 44 is illustrated in FIG. 8. At Step 110, the wedge 44 periodically sends out a beacon on the control channel to look for a new scanner to join to the network. At Step 112, if an attach request is received from a wireless scanner, the wedge 44 requests authorization from the host computer 40 to allow the scanner to join the network. If the scanner is accepted at Step 114, the wedge 44 sends an attach response to the scanner at Step 116. If no attached response is received, or if the scanner is not accepted into the network, control goes back to Step 110 and the wedge continues to beacon on the control channel.

Figure 9:
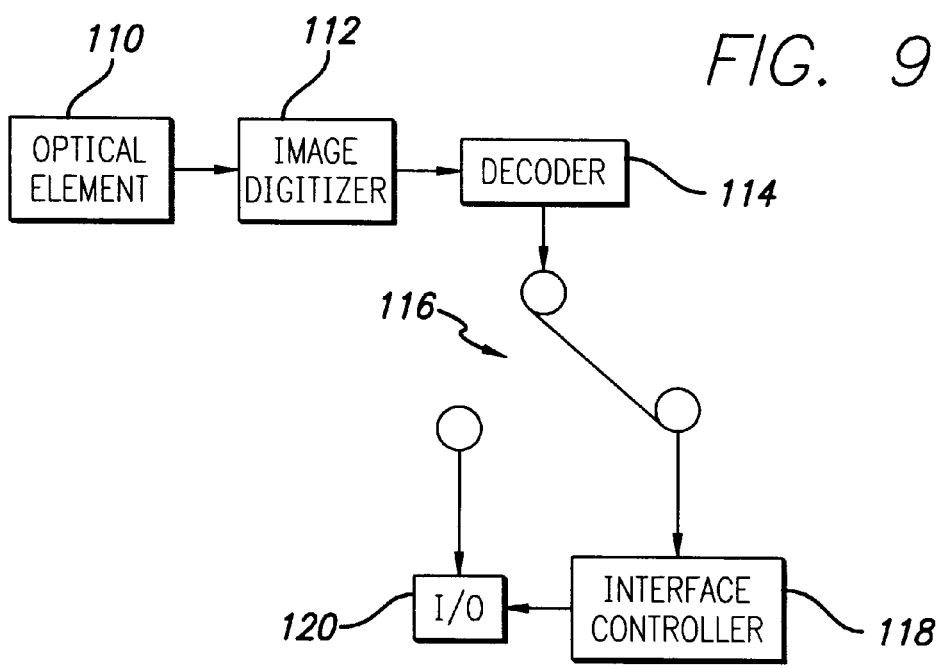
FIG. 9 is a block diagram of a wireless scanner of a second preferred embodiment of the present invention.

A second preferred embodiment of a wireless scanner will now be described with reference to the block diagram of FIG. 9. The wireless scanner includes an optical element 110, an image digitizer 112, a decoder 114, an interface controller 118 and an I/O device 120. The decoder 114 includes algorithms for decoding standard bar code symbologies, but unlike the wireless scanner of the first preferred embodiment, does not include algorithms for decoding modified bar code symbologies.

The wireless scanner of the second preferred embodiment handles network ID labels through the use of a switch 116. In a first position, the switch 116 connects the decoder to the interface controller 118. When a decoded string is received by the interface controller 118, it is treated as a network ID label, and an attempt is made to parse the string. The operation of the interface controller 118 and the I/O device 120 is the same as illustrated in the first preferred embodiment. When the switch 116 is in a second position, it connects the decoder 114 directly to the I/O device 120. When the decoded string is received by the interface controller 118, it is treated as data, and the I/O device will attempt to send the data over the wireless communications link. It is preferred that the switch 116 be operated manually by the user.

Figure 10:
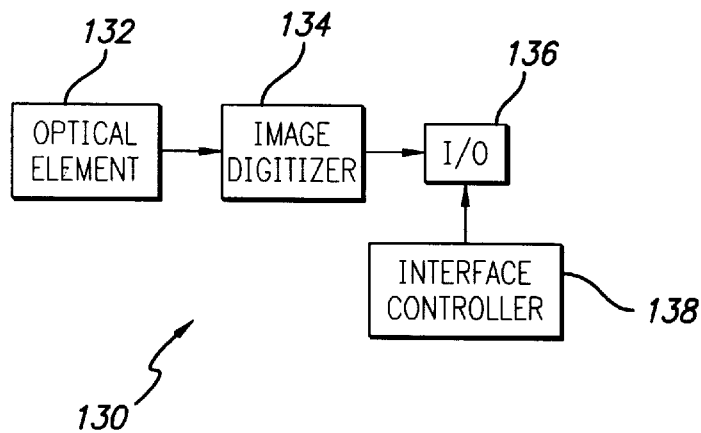
FIG. 10 is a block diagram of a wireless scanner of a third preferred embodiment of the present invention.
Figure 11:
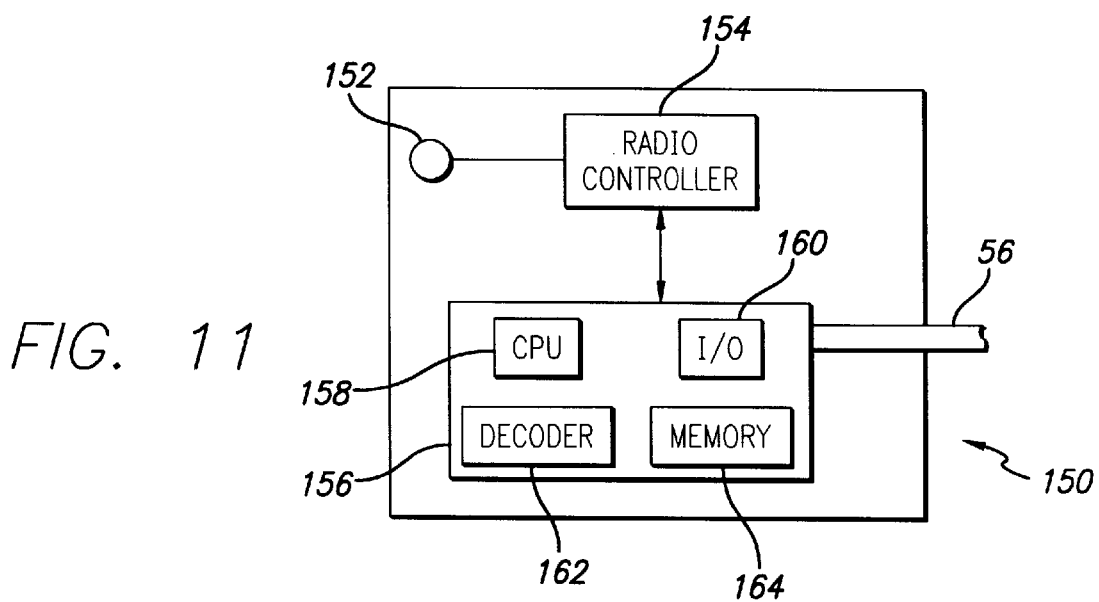
FIG. 11 is a block diagram of a wedge of a third preferred embodiment of the present invention.

A third preferred embodiment of the present invention will now be described with reference to the block diagrams of FIGS. 10 and 11. Referring first to FIG. 10, a wireless scanner 130 includes an optical element 132, an image digitizer 134, an I/O device 136 and an interface controller 138. The wireless scanner 130 is adapted to scan and digitize a printed bar code symbol utilizing the optical element 132 and the image digitizer 134. The resulting digitized image is passed to the I/O device 136 for forwarding to a wireless base station, such as a wedge 150 illustrated in FIG. 11. The interface controller 138 controls the I/O device 136 and includes at least two modes of operation: a data transfer mode and an association mode. In the data transfer mode, the digitized image is transmitted across an established communications link to the wedge 150. In the association mode, the I/O device 136 is instructed by the interface controller 138 to wait on a predetermined control channel for a beacon from the wedge 150. When a beacon is detected, the I/O device 136 transmits an attach request, including the digitized image (presumed to be the digitized image of a network ID label) across the predetermined control channel to the wedge 150 to initiate an association of the wireless scanner 130 with the wedge 150.

A wireless base station of the third preferred embodiment will now be described with reference to FIG. 11. As illustrated, the wireless base station is a wedge 150 that includes an antenna 152 and a radio controller 154 connected to a circuit board 156. The circuit board 156 includes a CPU 158, an I/O device 160, a decoder 162 and a memory 164. In operation, the wedge 150 periodically sends a beacon through the antenna 152 on a predetermined control channel to search for new wireless devices, such as the wireless scanner 130, to join the network. As discussed above, when the wireless scanner 130 sends an attach request, it will send a digitized image across the predetermined control channel. When the digitized image is received by the antenna 152 on the predetermined control channel, it is sent to the circuit board 156 by the radio controller 154. At the circuit board 156, the decoder 162 attempts to decode the digitized image into an alphanumeric string in accordance with at least one bar code symbology. If the decoder 162 is able to decode the digitized image and the resulting alphanumeric string matches the unique network ID for the wedge 150, the wedge 150 will allow the wireless scanner 130 to join the network. Association of the wireless scanner 130 to the wedge 150 then proceeds in the manner disclosed in the first preferred embodiment.

Once a communications link is established between the wedge 150 and the wireless scanner 130, the wedge 150 can receive the digitized images of printed bar code symbols scanned by the wireless scanner 130 in the data transfer mode. The digitized images are received by the antenna 152 and sent to the circuit board 156 by the radio controller 154. At the circuit board 156, the decoder 162 attempts to decode the digitized image into an alphanumeric string in accordance with at least one bar code symbology. If decoding is successful, the resulting alphanumeric string can then be sent to the host computer connected to the wedge 150 for use as data input. It should be appreciated that in the third preferred embodiment, either standard or modified bar code symbologies may be utilized for the network ID labels.

Having thus described three preferred embodiments of a Method and Apparatus of Bar Code Association in a Wireless Network, it should be apparent to those skilled in the art that certain advantages of the within system have been achieved. It should also be appreciated that various modifications, adaptations, and alternative embodiments thereof may be made within the scope and spirit of the present invention. For example, a wedge connected between a computer and a keyboard has been illustrated, but it should be apparent that the inventive concepts described herein would be equally applicable to other wireless devices and other configurations, such as a connecting a wireless base station to a network through an Ethernet card.

As another example, the preferred embodiments illustrate that a wireless association is initiated between a wedge and a wireless scanner when a network ID label is scanned and decoded; however, the wireless association of the present invention may also be initiated in another manner, such as when the wireless scanner is powered up. In this example, the wireless scanner could store the last decoded network ID label in a nonvolatile memory and use this information to automatically associate the wireless scanner with the wedge with which it was last associated.

The scope of the invention is best determined by reference to the following claims.

What is claimed is:

1. A wireless network comprising:
   a base station adapted for wireless communications;
   a wireless scanner for communicating with said base station, said wireless scanner adapted to scan and decode a printed bar code label; and
   a network ID label having a bar code symbol printed thereon, said bar code symbol including coded information pertaining to said base station;
   wherein a wireless communications link is initiated between said base station and said wireless scanner when said wireless scanner scans and decodes said network ID label.

2. The wireless network of claim 1 wherein said base station comprises:
   a radio device for communicating with wireless devices in the wireless network.

3. The wireless network of claim 1 wherein said base station comprises:
   a host computer having a keyboard connected to the host computer through a cable; and
   a wedge, connected to the cable between the keyboard and said host computer, said wedge including a radio device for communicating with wireless devices in the wireless network.

4. The wireless network of claim 1 further comprising:
   a switch disposed on said wireless scanner, said switch being moveable between a first position for scanning and decoding said printed bar code label to initiate a communications link with said base station, and a second position for scanning and decoding said printed bar code symbol and transmitting said decoded information across an established wireless communications link.

5. The wireless network of claim 1 further comprising:
   a decoder disposed in said wireless scanner, said decoder adapted to decode standard bar code symbologies and further adapted to initiate a communications link when a series of at least one special character is decoded;
   wherein said bar code symbol of said network ID label includes said series of at least one special character.

6. The wireless network of claim 1 wherein said wireless scanner comprises:
   a decoder for decoding said printed bar code label into a decoded alphanumeric string, said decoder comprising algorithms for decoding a first set of bar code symbologies and a second set of bar code symbologies;
   wherein said network ID label is encoded utilizing a symbology from said second set of bar code symbologies.

7. The wireless network of claim 6 further comprising:
   an I/O device adapted to conduct wireless communications, and
   an interface controller for controlling the communications of said I/O device.

8. The wireless network of claim 7 wherein said decoder transmits said decoded alphanumeric string decoded in accordance with said first set of bar code symbologies to said I/O device where said decoded information is transmitted to said base station.

9. The wireless network of claim 8 wherein said decoder transmits said decoded alphanumeric string decoded in accordance with said second set of bar code symbologies to said interface controller to initiate said wireless communications link with said base station.

10. The wireless network of claim 2 wherein said wedge further comprises:
    a processor for controlling the operation of the wedge;
    a memory for storing program instructions for controlling the CPU, and for providing temporary data storage;
    an I/O device for communicating with the host computer; and
    a radio device for controlling RF communications between the wedge and said wireless scanner of the wireless network.

11. The wireless network of claim 6 wherein said network ID label, encoded in accordance with a symbology from said first set of bar code symbologies, cannot be decoded by said algorithms for decoding said second set of bar code symbologies.

12. The wireless network of claim 1 wherein said network ID label is disposed within RF range of said base station.

13. A wireless bar code scanner for wireless communications with a base station comprising:

a light source for illuminating a printed bar code symbol;

an electro-optical element for imaging said printed bar code symbol;

a decoder for decoding said imaged printed bar code symbol into an alphanumeric string;

an input/output device for conducting wireless communications with said base station;

wherein said wireless bar code scanner initiates a wireless communications link with said base station when said wireless scanner scans and decodes a printed bar code symbol having communications information corresponding to said base station.

14. The wireless bar code scanner of claim 13, wherein said decoder is adapted to recognize a printed bar code symbol having communications information encoded therein.

15. The wireless bar code scanner of claim 13 further comprising:

an interface controller for controlling wireless communications of the input/output device; and a switch being movable between a first position connecting said decoder to said interface controller, and a second position connecting said decoder to said input/output device;

wherein, when said switch is in said first position, said decoder sends said decoded alphanumeric string to said interface controller to initiate a wireless communications link in accordance with information in said alphanumeric string; and wherein, when said switch is in said second position, said decoder sends said decoded alphanumeric string to said input/output device to be sent to said base station over a wireless communications link.

16. A method, to be performed by a wireless bar code scanner, for wireless association between said wireless bar code scanner and a base station having a network ID label, comprising the steps of:

scanning said network ID label with said wireless bar code scanner, thereby obtaining communications information for initiating a wireless communications link with said base station; and initiating a communications link between said wireless bar code scanner and said base station in accordance with said communications information.

17. The method of claim 16 wherein said step of scanning further comprises:

decoding said scanned network ID label with a decoder in said wireless bar code scanner, said decoder comprising algorithms for recognizing and decoding said network ID label.

18. The method of claim 16 wherein said step of initiating a communications link further comprises the step of:

listening on a control channel for a beacon from said base station.

19. The method of claim 18 wherein said step of initiating a communications link further comprises the step of:

transmitting an attach request to said base station after said beacon is detected in said step of listening.

20. The method of claim 19 further comprising the step of:

listening on said control channel for a response to said attach request from said base station.

* * * * *